US012625740B2

(12) United States Patent
Sundararajan

(10) Patent No.: US 12,625,740 B2
(45) Date of Patent: May 12, 2026

(54) SYSTEM AND METHOD FOR SMART SUBSCRIPTION TO CLOUD BASED SERVICES

(71) Applicant: JPMorgan Chase Bank, N.A., New York, NY (US)

(72) Inventor: Mahendiran Sundararajan, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 441 days.

(21) Appl. No.: 18/367,182

(22) Filed: Sep. 12, 2023

(65) Prior Publication Data

US 2024/0086256 A1     Mar. 14, 2024

Related U.S. Application Data

(60) Provisional application No. 63/406,038, filed on Sep. 13, 2022.

(51) Int. Cl.
*G06F 9/50*          (2006.01)
(52) U.S. Cl.
CPC .......... *G06F 9/5077* (2013.01); *G06F 9/5072* (2013.01)
(58) Field of Classification Search
None
See application file for complete search history.

(56) References Cited

U.S. PATENT DOCUMENTS

| 8,239,509 | B2 * | 8/2012 | Ferris | H04L 41/5051 |
| | | | | 709/224 |
| 8,909,783 | B2 * | 12/2014 | Ferris | G06F 9/45533 |
| | | | | 726/23 |
| 8,935,692 | B2 * | 1/2015 | Ferris | G06F 9/5077 |
| | | | | 718/1 |
| 8,984,505 | B2 * | 3/2015 | Ferris | G06F 9/5027 |
| | | | | 718/1 |
| 9,438,484 | B2 * | 9/2016 | Ferris | H04L 47/70 |
| 9,842,004 | B2 * | 12/2017 | Ferris | G06F 9/4856 |
| 2018/0124194 | A1 * | 5/2018 | Rajewski | H04L 67/53 |

* cited by examiner

*Primary Examiner* — Van H Nguyen
(74) *Attorney, Agent, or Firm* — GREENBLUM & BERNSTEIN, P.L.C.

(57)          ABSTRACT
Various methods, apparatuses/systems, and media for automated subscription to cloud-based services are disclosed. A processor establishes a communication link between a cloud environment and a user interface via a communication interface, wherein cloud-based services are hosted in the cloud environment. The processor also implements a predefined ML/AI algorithm to determine service tier for each of said cloud-based services; provisions the services based on the determined service tier; continuously monitors preconfigured parameters associated with each service tier; builds a ML/AI based model based on the preconfigured parameters; automatically changes a level of each service tier based on implementing the ML/AI based model; receives user input data to subscribe to the cloud-based services; determines a service tier that matches the received user input data based on the ML/AI based model; and automatically allows subscription to the cloud-based services in accordance with the service tier that matches the received user input data.

3 Claims, 13 Drawing Sheets

100

200

300

500

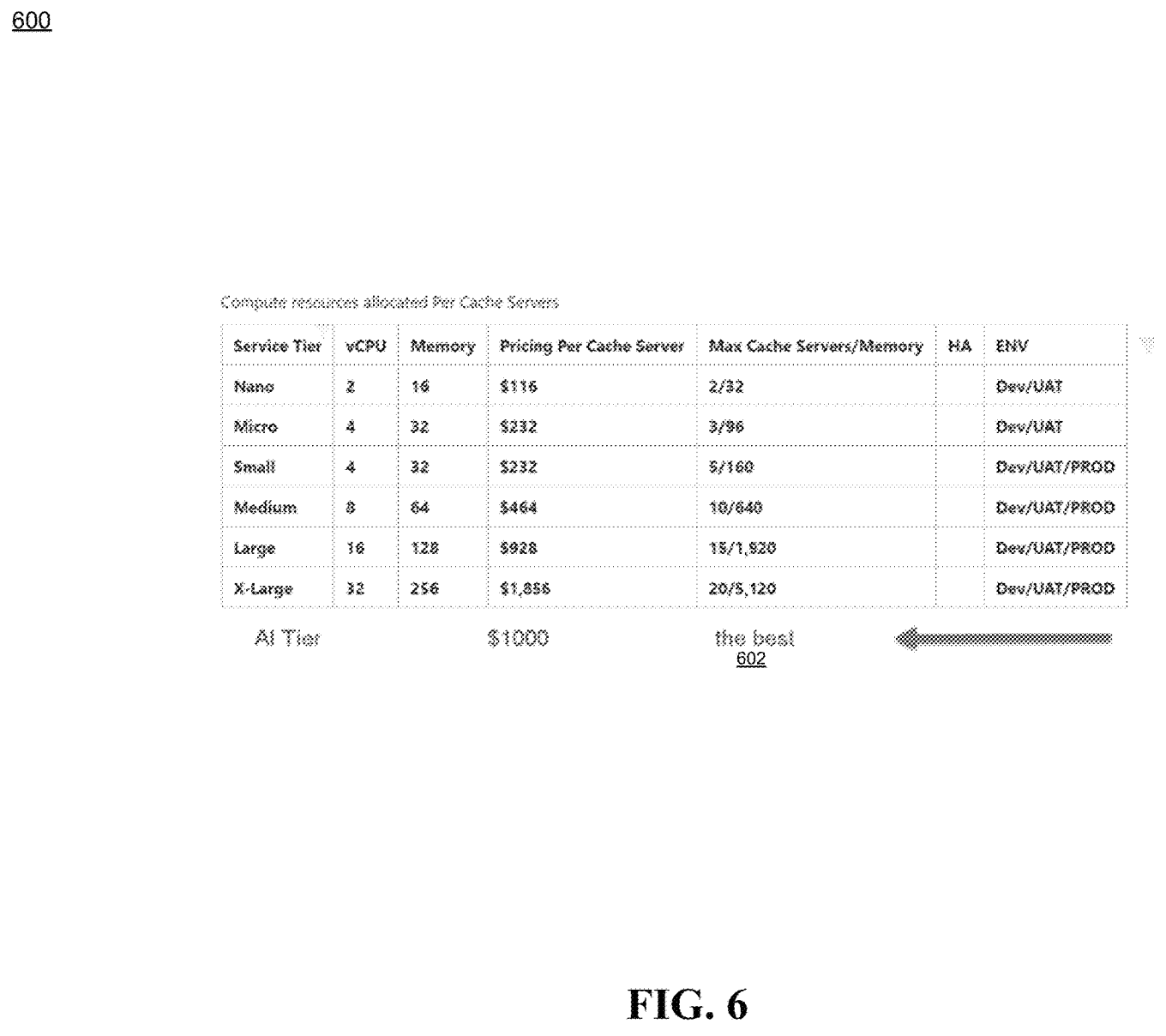

600

Computer resources allocated Per Cache Servers

| Service Tier | vCPU | Memory | Pricing Per Cache Server | Max Cache Servers/Memory | HA | ENV |
|---|---|---|---|---|---|---|
| Nano | 2 | 16 | $116 | 2/32 | | Dev/UAT |
| Micro | 4 | 32 | $232 | 3/96 | | Dev/UAT |
| Small | 4 | 32 | $232 | 5/160 | | Dev/UAT/PROD |
| Medium | 8 | 64 | $464 | 10/640 | | Dev/UAT/PROD |
| Large | 16 | 128 | $928 | 15/1,920 | | Dev/UAT/PROD |
| X-Large | 32 | 256 | $1,856 | 20/5,120 | | Dev/UAT/PROD |

All Tier     $1000 the best
602

FIG. 6

| Performance | Cost Savings | Traffic | Reward | AI Decision |
|---|---|---|---|---|
| High | Less | Not applicable | High | More number of clusters |
| Low | High | Not Applicable | Less | Less number of clusters |

SYSTEM AND METHOD FOR SMART SUBSCRIPTION TO CLOUD BASED SERVICES

CROSS-REFERENCE TO RELATED APPLICATIONS

This application claims the benefit of priority from U.S. Provisional Patent Application No. 63/406,038, filed Sep. 13, 2022, which is herein incorporated by reference in its entirety.

TECHNICAL FIELD

This disclosure generally relates to cloud computing, and, more particularly, to methods and apparatuses for implementing a language and platform agnostic smart cloud subscription module configured to provide, in cloud based services environment, customers to subscribe, monitor, and switch to different available tiers in an automated way.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Cloud computing is a model for enabling convenient, on-demand network access to a shared pool of configurable computing resources (e.g., networks, servers, storage, applications, and services). The services provided or accessed through the cloud (or network) are referred to as cloud services. There appears to be a lot of processing that needs to be performed by a cloud service provider to make cloud services available to a subscribing customer. Due to its complexity, much of this processing is still done manually. For example, provisioning resources for providing such cloud services can be a very labor intensive process.

All provisioned resources from the cloud environment are reserved and they are billed accordingly. It is time consuming and additional skills required to customers to provision and release resources based on the business needs. Cloud services are growing in number from each cloud provider, rendering it very difficult for customer to manage services efficiently.

For example, today, in cloud based services environment, customers are not able to subscribe, monitor and switch to different available tiers in an automated way. In conventional cloud subscription processes, as a first step, customer to a specific cloud service expected to have prior knowledge on the cloud based service and subscribe based on the business need. The challenge here is that not all customers have expert knowledge on a specific cloud service while subscribing. Customers may need some expert opinion on the subscription while subscribing to a cloud service and/or during operation. In another case, performance and scalability might be the best need in the production environment whereas saving cost might be the best need in the test environment. However, it may prove to be extremely difficult to foresee all the needs on subscription. Moreover, it is difficult to monitor and track whether in automated way the subscription tier is best suited for the business use case. Simply put, in conventional cloud subscription processes, there is lack of automated decision making on subscription tiers or switching to best subscription tiers, based on the changing business needs.

SUMMARY

The present disclosure, through one or more of its various aspects, embodiments, and/or specific features or sub-components, provides, among other features, various systems, servers, devices, methods, media, programs, and platforms for implementing a language and platform agnostic smart cloud subscription module configured to provide, in cloud based services environment, customers to subscribe, monitor, and switch to different available tiers in an automated way based on changing business and/or customer needs, but the disclosure is not limited thereto. For example, the present disclosure, through one or more of its various aspects, embodiments, and/or specific features or sub-components, also provides, among other features, various systems, servers, devices, methods, media, programs, and platforms for implementing a language and platform agnostic smart cloud subscription module configured to provide, in cloud based services environment, machine learning (ML)/ artificial intelligence (AI) based automated decision making to subscribe to and/or switch to different available tiers, but the disclosure is not limited thereto.

According to an aspect of the present disclosure, a method for automated subscription to cloud-based services by utilizing one or more processors along with allocated memory is disclosed. The method may include: establishing a communication link between a cloud environment and a user interface via a communication interface, wherein cloud-based services are hosted in the cloud environment; implementing a predefined ML/AI algorithm to determine service tier for each of said cloud-based services; provisioning the services based on the determined service tier; continuously monitoring preconfigured parameters associated with each service tier; building a ML/AI based model based on the preconfigured parameters; automatically changing a level of each service tier based on implementing the ML/AI based model; receiving user input data via the user interface to subscribe to the cloud-based services; determining a service tier that matches the received user input data based on the ML/AI based model; and automatically allowing subscription to the cloud-based services in accordance with the service tier that matches the received user input data.

According to a further aspect of the present disclosure, the preconfigured parameters may include one or more of the following parameters: traffic data associated with each service tier; memory capacity data of each database associated with each service tier; and CPU usage data associated with each service tier, but the disclosure is not limited thereto.

According to another aspect of the present disclosure, the method may further include: continuously monitoring the traffic data, memory capacity data, and the CPU usage data associated with each service tier.

According to yet another aspect of the present disclosure, the method may further include: automatically changing the level of each service tier from a higher level to a lower level when it is determined that the traffic data, or the memory capacity data, or the CPU usage data associated with corresponding service tier is below a predetermined threshold value.

According to an aspect of the present disclosure, the method may further include: automatically updating the ML/AI model in accordance with the changed level of the corresponding service tier.

According to a further aspect of the present disclosure, the method may further include: automatically changing the level of each service tier from a lower level to a higher level when it is determined that the traffic data, or the memory capacity data, or the CPU usage data associated with corresponding service tier is equal to or above a predetermined threshold value.

According to another aspect of the present disclosure, the method may further include: automatically updating the ML/AI model in accordance with the changed level of the corresponding service tier.

According to an aspect of the present disclosure, a system for automated subscription to cloud-based services is disclosed. The system may include: a processor; and a memory operatively connected to the processor via a communication interface, the memory storing computer readable instructions, when executed, may cause the processor to: establish a communication link between a cloud environment and a user interface via a communication interface, wherein cloud-based services are hosted in the cloud environment; implement a predefined ML/AI algorithm to determine service tier for each of said cloud-based services; provision the services based on the determined service tier; continuously monitor preconfigured parameters associated with each service tier; build a ML/AI based model based on the preconfigured parameters; automatically change a level of each service tier based on implementing the ML/AI based model; receive user input data via the user interface to subscribe to the cloud-based services; determine a service tier that matches the received user input data based on the ML/AI based model; and automatically allow subscription to the cloud-based services in accordance with the service tier that matches the received user input data.

According to another aspect of the present disclosure, the processor may be further configured to: continuously monitor the traffic data, memory capacity data, and the CPU usage data associated with each service tier.

According to yet another aspect of the present disclosure, the processor may be further configured to: automatically change the level of each service tier from a higher level to a lower level when it is determined that the traffic data, or the memory capacity data, or the CPU usage data associated with corresponding service tier is below a predetermined threshold value.

According to an aspect of the present disclosure, the processor may be further configured to: automatically update the ML/AI model in accordance with the changed level of the corresponding service tier.

According to a further aspect of the present disclosure, the processor may be further configured to: automatically change the level of each service tier from a lower level to a higher level when it is determined that the traffic data, or the memory capacity data, or the CPU usage data associated with corresponding service tier is equal to or above a predetermined threshold value.

According to another aspect of the present disclosure, the processor may be further configured to: automatically update the ML/AI model in accordance with the changed level of the corresponding service tier.

According to an aspect of the present disclosure, a non-transitory computer readable medium configured to store instructions for automated subscription to cloud-based is disclosed. The instructions, when executed, may cause a processor to perform the following: establishing a communication link between a cloud environment and a user interface via a communication interface, wherein cloud-based services are hosted in the cloud environment; implementing a predefined ML/AI algorithm to determine service tier for each of said cloud-based services; provisioning the services based on the determined service tier; continuously monitoring preconfigured parameters associated with each service tier; building a ML/AI based model based on the preconfigured parameters; automatically changing a level of each service tier based on implementing the ML/AI based model; receiving user input data via the user interface to subscribe to the cloud-based services; determining a service tier that matches the received user input data based on the ML/AI based model; and automatically allowing subscription to the cloud-based services in accordance with the service tier that matches the received user input data.

According to another aspect of the present disclosure, the instructions, when executed, may cause the processor to perform the following: continuously monitoring the traffic data, memory capacity data, and the CPU usage data associated with each service tier.

According to yet another aspect of the present disclosure, the instructions, when executed, may cause the processor to perform the following: automatically changing the level of each service tier from a higher level to a lower level when it is determined that the traffic data, or the memory capacity data, or the CPU usage data associated with corresponding service tier is below a predetermined threshold value.

According to an aspect of the present disclosure, the instructions, when executed, may cause the processor to perform the following: automatically updating the ML/AI model in accordance with the changed level of the corresponding service tier.

According to a further aspect of the present disclosure, the instructions, when executed, may cause the processor to perform the following: automatically changing the level of each service tier from a lower level to a higher level when it is determined that the traffic data, or the memory capacity data, or the CPU usage data associated with corresponding service tier is equal to or above a predetermined threshold value.

According to another aspect of the present disclosure, the instructions, when executed, may cause the processor to perform the following: automatically updating the ML/AI model in accordance with the changed level of the corresponding service tier.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates an exemplary table that illustrates compute resources allocated per cache servers for AI/ML based subscription implemented by the language and platform agnostic SCSM 406 of FIG. 4 in accordance with an exemplary embodiment.

FIG. 9 illustrates an exemplary table that illustrates an algorithm for generating AI/ML decision implemented by the language and platform agnostic SCSM 406 of FIG. 4 in accordance with an exemplary embodiment.

DETAILED DESCRIPTION

Figure 1:
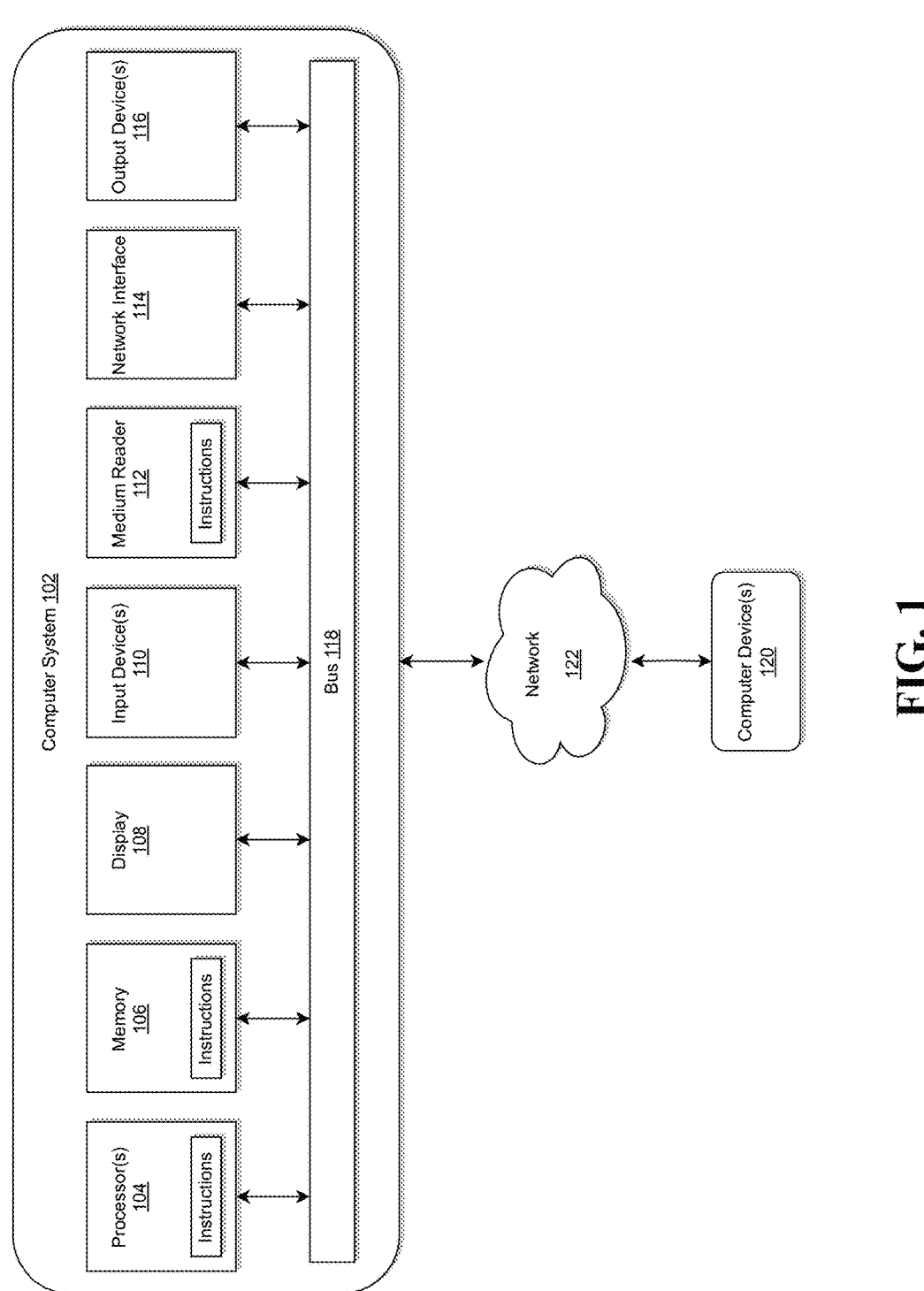
FIG. 1 illustrates a computer system for implementing a language and platform agnostic smart cloud subscription module configured to provide, in cloud based services environment, customers to subscribe, monitor, and switch to different available tiers in an automated way in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a language and platform agnostic smart cloud subscription module configured to provide, in cloud based services environment, customers to subscribe, monitor, and switch to different available tiers in an automated way in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the smart cloud subscription module may be platform, cloud, and language agnostic that may allow for consistent easy orchestration and passing of data through various components to output a desired result regardless of cloud environment. Since the disclosed process, according to exemplary embodiments, is platform, cloud, and language agnostic, the smart cloud subscription module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
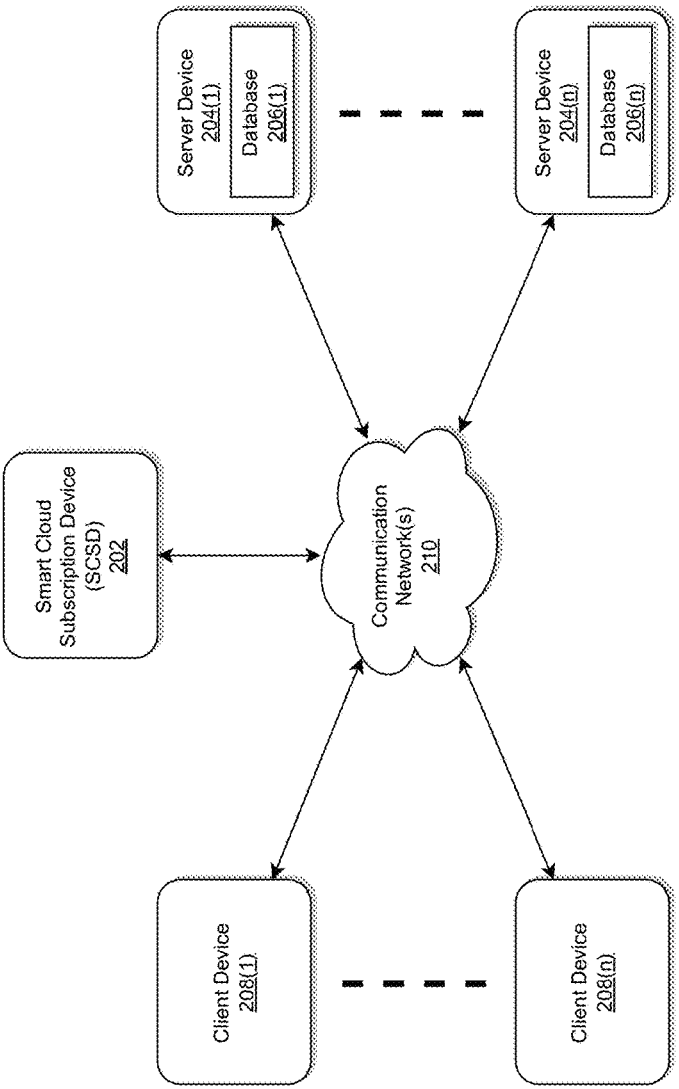
FIG. 2 illustrates an exemplary diagram of a network environment with a language and platform agnostic smart cloud subscription device in accordance with an exemplary embodiment.

Referring to FIG. 2, a schematic of an exemplary network environment 200 for implementing a language and platform agnostic smart cloud subscription device (SCSD) of the instant disclosure is illustrated.

According to exemplary embodiments, the above-described problems associated with conventional tools may be overcome by implementing a language and platform agnostic SCSD 202 as illustrated in FIG. 2 that may be configured to provide, in cloud based services environment, customers to subscribe, monitor, and switch to different available tiers in an automated way based on changing business and/or customer needs, but the disclosure is not limited thereto. For example, according to exemplary embodiments, the above-described problems associated with conventional tools may be overcome by implementing a language and platform agnostic SCSD 202 as illustrated in FIG. 2 that may be configured to provide, in cloud based services environment, artificial intelligence (AI) based automated decision making to subscribe to and/or switch to different available tiers, but the disclosure is not limited thereto.

The SCSD 202 may be the same or similar to the computer system 102 as described with respect to FIG. 1.

The SCSD 202 may store one or more applications that can include executable instructions that, when executed by the SCSD 202, cause the SCSD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCSD 202 itself, may be located in virtual server(s) running in a cloud-based computing environment rather than being tied to one or more specific physical network computing devices. Also, the application(s) may be running in one or more virtual machines (VMs) executing on the SCSD 202. Additionally, in one or more embodiments of this technology, virtual machine(s) running on the SCSD 202 may be managed or supervised by a hypervisor.

In the network environment 200 of FIG. 2, the SCSD 202 is coupled to a plurality of server devices 204(1)-204(n) that hosts a plurality of databases 206(1)-206(n), and also to a plurality of client devices 208(1)-208(n) via communication network(s) 210. A communication interface of the SCSD 202, such as the network interface 114 of the computer system 102 of FIG. 1, operatively couples and communicates between the SCSD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCSD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCSD 202 may be a standalone device or integrated with one or more other devices or apparatuses, such as one or more of the server devices 204(1)-204(n), for example. In one particular example, the SCSD 202 may be hosted by one of the server devices 204(1)-204(n), and other arrangements are also possible. Moreover, one or more of the devices of the SCSD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SCSD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SCSD 202 that may efficiently provide a platform for implementing a language and platform agnostic smart cloud subscription module configured to provide, in cloud based services environment, customers to subscribe, monitor, and switch to different available tiers in an automated way based on changing business and/or customer needs, but the disclosure is not limited thereto. For example, according to exemplary embodiments, the client devices 208(1)-208(n) in this example may include any type of computing device that can facilitate the implementation of the SCSD 202 that may efficiently provide a platform for implementing a language and platform agnostic smart cloud subscription module configured to provide, in cloud based services environment, artificial intelligence (AI) based automated decision making to subscribe to and/or switch to different available tiers, but the disclosure is not limited thereto.

The client devices 208(1)-208(n) may run interface applications, such as standard web browsers or standalone client applications, which may provide an interface to communicate with the SCSD 202 via the communication network(s)

210 in order to communicate user requests. The client devices 208(1)-208(n) may further include, among other features, a display device, such as a display screen or touchscreen, and/or an input device, such as a keyboard, for example.

Although the exemplary network environment 200 with the SCSD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SCSD 202, the server devices 204(1)-204(n), or the client devices 208(1)-208(n), for example, may be configured to operate as virtual instances on the same physical machine. For example, one or more of the SCSD 202, the server devices 204(1)-204(n), or the client devices 208(1)-208(n) may operate on the same physical device rather than as separate devices communicating through communication network(s) 210. Additionally, there may be more or fewer SCSDs 202, server devices 204(1)-204(n), or client devices 208(1)-208(n) than illustrated in FIG. 2. According to exemplary embodiments, the SCSD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
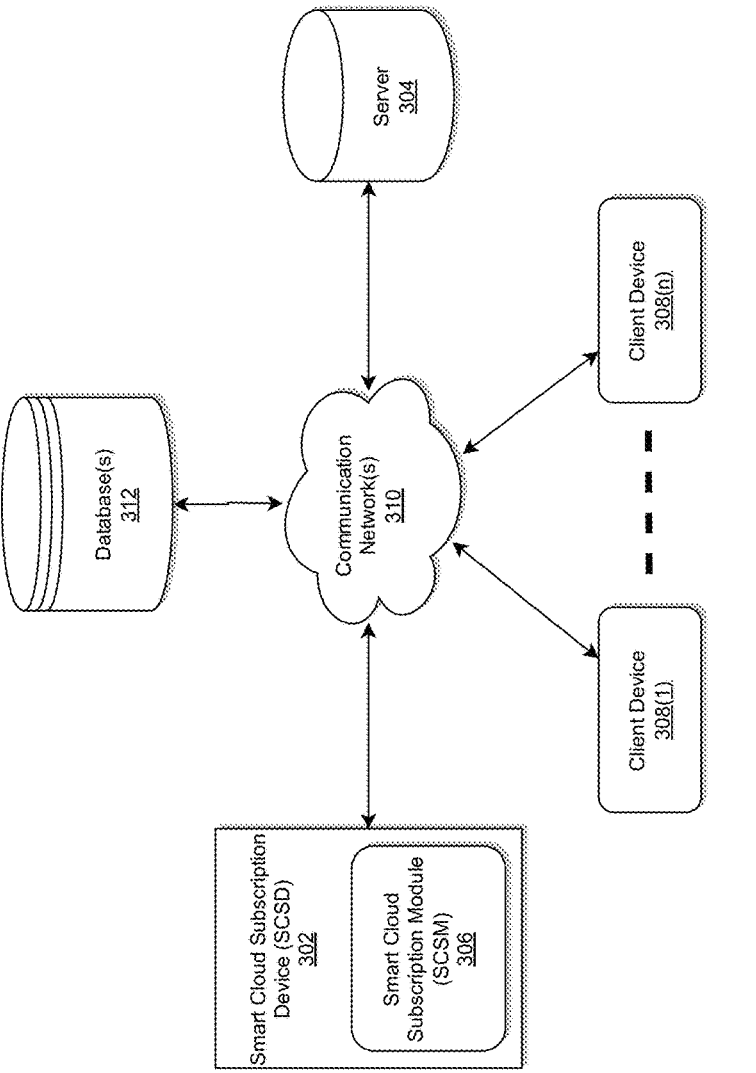
FIG. 3 illustrates a system diagram for implementing a language and platform agnostic smart cloud subscription device having a language and platform agnostic smart cloud subscription module in accordance with an exemplary embodiment.

FIG. 3 illustrates a system diagram for implementing a language and platform agnostic SCSD having a language and platform agnostic smart cloud subscription module (SCSM) in accordance with an exemplary embodiment.

As illustrated in FIG. 3, the system 300 may include a SCSD 302 within which an SCSM 306 is embedded, a server 304, a database(s) 312, a plurality of client devices 308(1) . . . 308(n), and a communication network 310.

According to exemplary embodiments, the SCSD 302 including the SCSM 306 may be connected to the server 304, and the database(s) 312 via the communication network 310. The SCSD 302 may also be connected to the plurality of client devices 308(1) . . . 308(n) via the communication network 310, but the disclosure is not limited thereto.

According to exemplary embodiment, the SCSD 302 is described and shown in FIG. 3 as including the SCSM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SCSM 306 may be configured to receive real-time feed of data from the plurality of client devices 308(1) . . . 308(n) via the communication network 310.

As may be described below, the SCSM 306 may be configured to: establish a communication link between a cloud environment and a user interface via a communication interface, wherein cloud-based services are hosted in the cloud environment; implement a predefined ML/AI algorithm to determine service tier for each of the cloud-based services; provision the services based on the determined service tier; continuously monitor preconfigured parameters associated with each service tier; build a ML/AI based model based on the preconfigured parameters; automatically change a level of each service tier based on implementing the ML/AI based model; receive user input data via the user interface to subscribe to the cloud-based services; determine a service tier that matches the received user input data based on the ML/AI based model; and automatically allow subscription to the cloud-based services in accordance with the service tier that matches the received user input data, but the disclosure is not limited thereto. The database(s) 312, server 304, and the communication network 310 may form the cloud environment.

The plurality of client devices 308(1) . . . 308(n) are illustrated as being in communication with the SCSD 302. In this regard, the plurality of client devices 308(1) . . . 308(n) may be "clients" (e.g., customers) of the SCSD 302 and are described herein as such. Nevertheless, it is to be known and understood that the plurality of client devices 308(1) . . . 308(n) need not necessarily be "clients" of the SCSD 302, or any entity described in association therewith herein. Any additional or alternative relationship may exist between either or both of the plurality of client devices 308(1) . . . 308(n) and the SCSD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SCSD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SCSD 302 may be the same or similar to the SCSD 202 as described with respect to FIG. 2, including any features or combination of features described with respect thereto.

Figure 4:
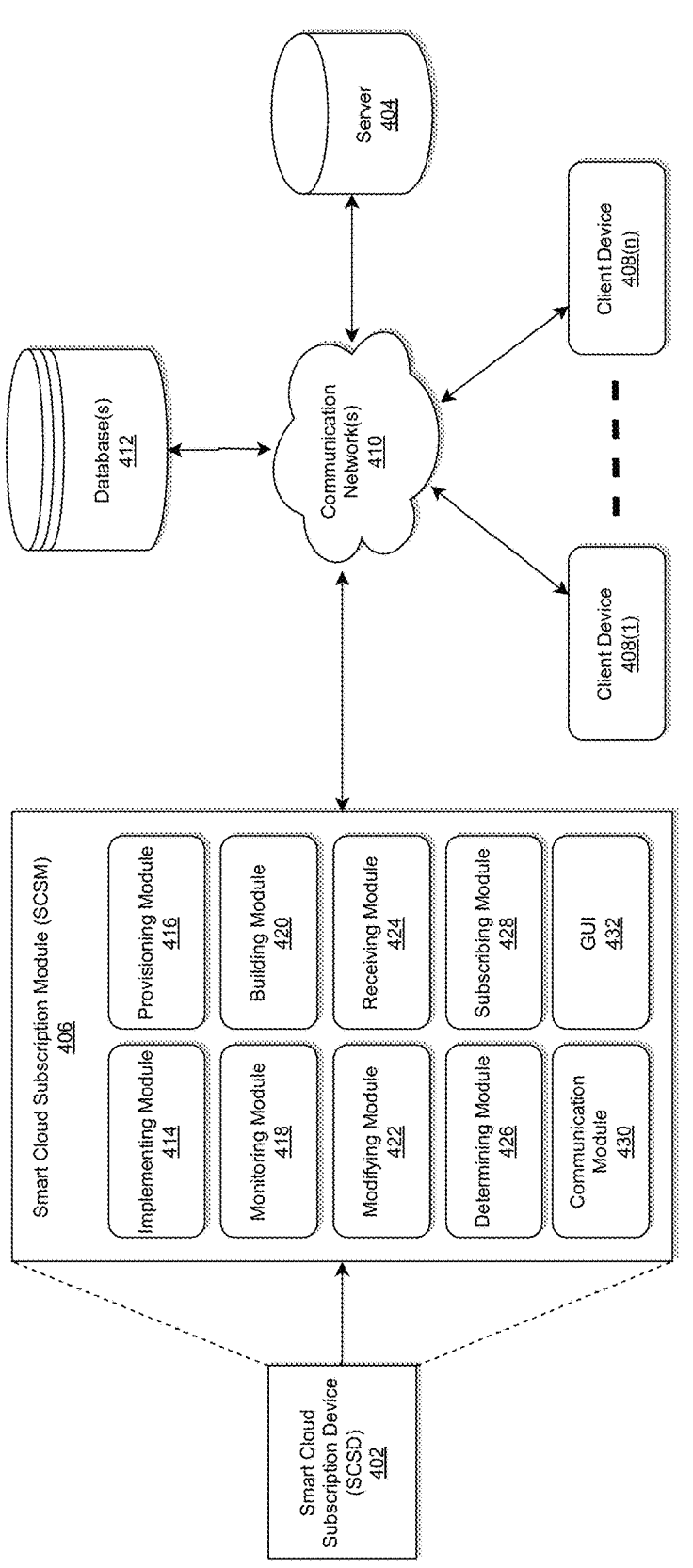
FIG. 4 illustrates a system diagram for implementing a language and platform agnostic smart cloud subscription module of FIG. 3 in accordance with an exemplary embodiment.

FIG. 4 illustrates a system diagram for implementing a language and platform agnostic SCSM of FIG. 3 in accordance with an exemplary embodiment.

According to exemplary embodiments, the system 400 may include a language and platform agnostic SCSD 402 within which a language and platform agnostic SCSM 406 is embedded, a server 404, database(s) 412, and a communication network 410.

According to exemplary embodiments, the SCSD 402 including the SCSM 406 may be connected to the server 404 and the database(s) 412 via the communication network 410. The SCSD 402 may also be connected to the plurality of client devices 408(1)-408(n) via the communication network 410, but the disclosure is not limited thereto. The SCSM 406, the server 404, the plurality of client devices 408(1)-408(n), the database(s) 412, the communication network 410 as illustrated in FIG. 4 may be the same or similar to the SCSM 306, the server 304, the plurality of client devices 308(1)-308(n), the database(s) 312, the communication network 310, respectively, as illustrated in FIG. 3.

According to exemplary embodiments, as illustrated in FIG. 4, the SCSM 406 may include an implementing module 414, a provision module 416, a monitoring module 418, a building module 420, a modifying module 422, a receiving module 424, a determining module 426, a subscribing module 428, a communication module 430, and a graphical user interface (GUI) 432. According to exemplary embodiments, interactions and data exchange among these modules included in the SCSM 406 provide the advantageous effects of the disclosed invention. Functionalities of each module of FIG. 4 may be described in detail below with reference to FIGS. 4-10.

According to exemplary embodiments, each of the implementing module 414, provision module 416, monitoring module 418, building module 420, modifying module 422, receiving module 424, determining module 426, subscribing module 428, and the communication module 430 of the SCSM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, provision module 416, monitoring module 418, building module 420, modifying module 422, receiving module 424, determining module 426, subscribing module 428, and the communication module 430 of the SCSM 406 may be implemented by microprocessors or similar, and may be programmed using software (e.g., microcode) to perform various functions discussed herein and may optionally be driven by firmware and/or software.

Alternatively, according to exemplary embodiments, each of the implementing module 414, provision module 416, monitoring module 418, building module 420, modifying module 422, receiving module 424, determining module 426, subscribing module 428, and the communication module 430 of the SCSM 406 may be implemented by dedicated hardware, or as a combination of dedicated hardware to perform some functions and a processor (e.g., one or more programmed microprocessors and associated circuitry) to perform other functions.

According to exemplary embodiments, each of the implementing module 414, provision module 416, monitoring module 418, building module 420, modifying module 422, receiving module 424, determining module 426, subscribing module 428, and the communication module 430 of the SCSM 406 may be called via corresponding API.

According to exemplary embodiments, the process may be executed via the communication module 430 and the communication network 410, which may comprise plural networks as described above. For example, in an exemplary embodiment, the various components of the SCSM 406 may communicate with the server 404, and the database(s) 412 via the communication module 430 and the communication network 410. Of course, these embodiments are merely exemplary and are not limiting or exhaustive.

According to exemplary embodiments, the communication module 430 may be configured to establish a communication link between a cloud environment (i.e., the database(s) 412, server 404, and the communication network(s) 410)) and a user interface (i.e., GUI 432) via a communication interface within the GUI 432, wherein cloud-based services are hosted in the cloud environment. The implementing module 414 may be configured to implement a predefined ML/AI algorithm (see, e.g., FIGS. 7 and 9) to determine service tier for each of said cloud-based services. The provisioning module 416 may be configured to provision the services based on the determined service tier.

According to exemplary embodiments, the monitoring module 418 may be configured to continuously monitor preconfigured parameters associated with each service tier. The building module 420 may be configured to build a ML/AI based model based on the preconfigured parameters. The modifying module 422 may be configured to automatically change a level of each service tier based on implementing the ML/AI based model.

According to exemplary embodiments, the receiving module 424 may be configured to receive user input data via the GUI 432 to subscribe to the cloud-based services. The determining module 426 may be configured to determine a service tier that matches the received user input data based on the ML/AI based model. The subscribing module 428 may be configured to automatically allow subscription to the cloud-based services in accordance with the service tier that matches the received user input data.

According to exemplary embodiments, the preconfigured parameters may include one or more of the following parameters: traffic data associated with each service tier; memory capacity data of each database associated with each service tier; and CPU usage data associated with each service tier, but the disclosure is not limited thereto. According to exemplary embodiments, AI/ML based tier starts from large or maximum configuration. The monitoring module 418 may be configured to monitor certain parameters to determine the service tier, such as traffic, memory, CPU usage, etc., but the disclosure is not limited thereto. According to exemplary embodiments, the building module 420 may be configured to build the AI/ML based model expand or shrink the size of the tier based on the above data from logging systems such as Splunk Dynatrace, Kibana, etc., but the disclosure is not limited thereto. The process implemented by the SCSM 406 may start with start with lower environment such as development and testing.

According to exemplary embodiments, the monitoring module 418 may be configured to continuously monitor the traffic data, memory capacity data, and the CPU usage data associated with each service tier.

According to exemplary embodiments, the modifying module 422 may be configured to automatically change the level of each service tier from a higher level to a lower level when it is determined that the traffic data, or the memory capacity data, or the CPU usage data associated with corresponding service tier is below a predetermined threshold value.

According to exemplary embodiments, the modifying module 422 may also be configured to automatically update the ML/AI model in accordance with the changed level of the corresponding service tier.

According to exemplary embodiments, the modifying module 422 may also be configured to automatically change the level of each service tier from a lower level to a higher level when it is determined that the traffic data, or the memory capacity data, or the CPU usage data associated with corresponding service tier is equal to or above a predetermined threshold value.

According to exemplary embodiments, the modifying module 422 may also be configured to automatically update the ML/AI model in accordance with the changed level of the corresponding service tier.

Figure 5:
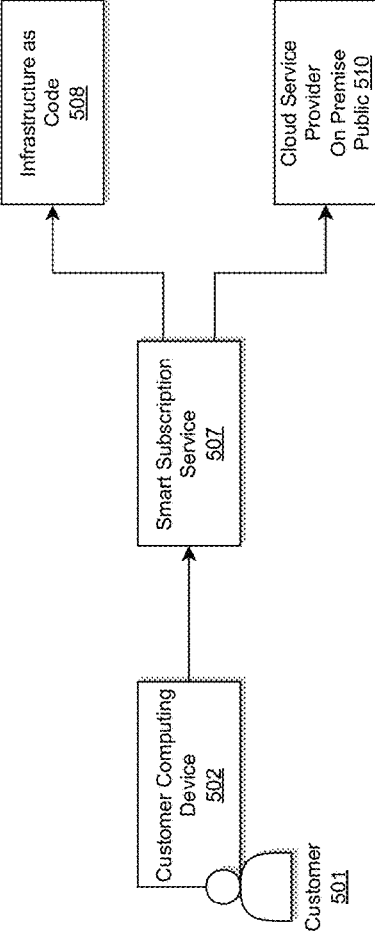
FIG. 5 illustrates an exemplary smart subscription—external to cloud service provider—implemented by the language and platform agnostic smart cloud subscription module of FIG. 4 in accordance with an exemplary embodiment.

FIG. 5 illustrates an exemplary smart subscription architecture 500—external to cloud service provider—implemented by the language and platform agnostic SCSM 406 of FIG. 4 in accordance with an exemplary embodiment. As illustrated in FIG. 5, a customer 501 may input data via the customer computing device 502 to subscribe to the smart subscription service 507. The smart subscription service 507 may provide infrastructure as code 508 or cloud service provider, i.e., on premise public cloud 510, but the disclosure is not limited thereto.

FIG. 6 illustrates an exemplary table 600 that illustrates compute resources allocated per cache servers for AI/ML based subscription implemented by the language and platform agnostic SCSM 406 of FIG. 4 in accordance with an exemplary embodiment. As illustrated in FIG. 6, the exemplary table 600 may include a column for service tier, a column for CPU, a column for memory, a column for pricing per cache server, a column for maximum cache servers/memory, a column for environment (i.e., development/UAT/Production) etc., but the disclosure is not limited thereto. As illustrated in FIG. 6, the SCSM 406 may return an AI based tier $1000 to be the best 602 according to this exemplary use case.

Figure 7:
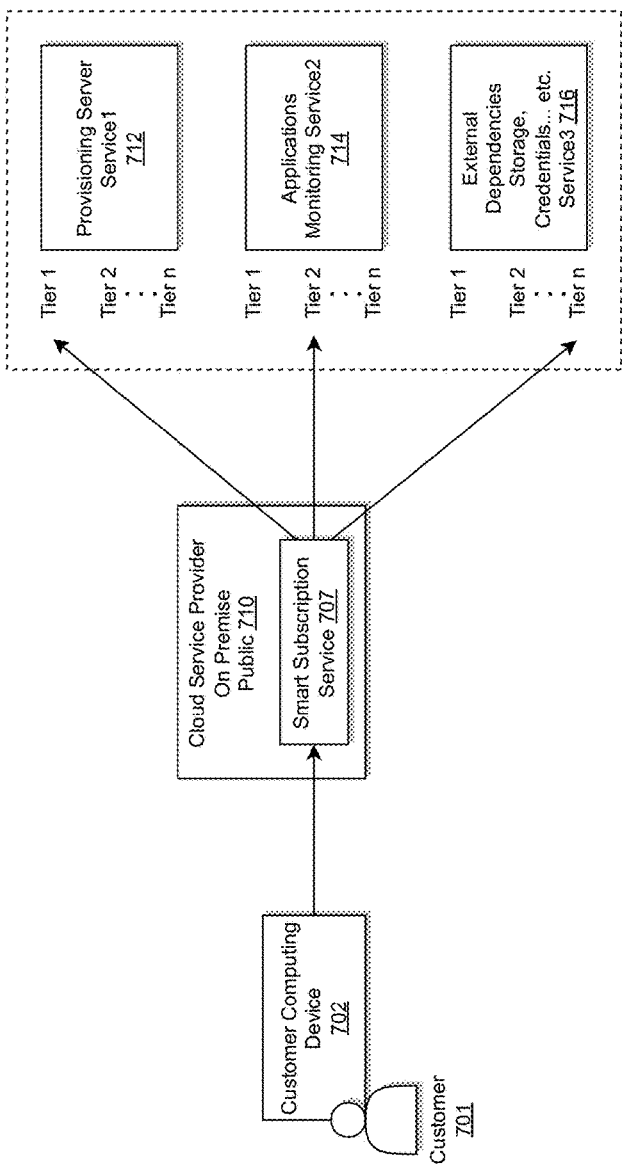
FIG. 7 illustrates another exemplary smart subscription—internal—integrated service within service provider—implemented by the language and platform agnostic smart cloud subscription module of FIG. 4 in accordance with an exemplary embodiment.

FIG. 7 illustrates another exemplary smart subscription architecture 700—internal—integrated service within service provider—implemented by the language and platform agnostic SCSM 406 of FIG. 4 in accordance with an exemplary embodiment. As illustrated in FIG. 7, the customer computing device 702 may receive input data from the customer 701 to subscribe to the smart subscription service 707 within the cloud service provide, i.e., on premise public cloud 710. The smart subscription service 707 may include provisioning server service1 712, applications monitoring service2 714, and external dependencies storage, credentials, etc. service3 716, but the disclosure is not limited thereto. Each of the service1 712, service2 714, and. service3 716 may include corresponding plurality of service tier, i.e., Tier 1, Tier 2, . . . . Tier n, based on customer 701 business needs. The language and platform agnostic SCSM 406 may be configured to provide, in cloud based services environment, artificial intelligence (AI) based automated decision making for the customer 701 to subscribe to and/or switch to different available tiers in an automated way based on changing business and/or customer needs, but the disclosure is not limited thereto.

Figure 8:
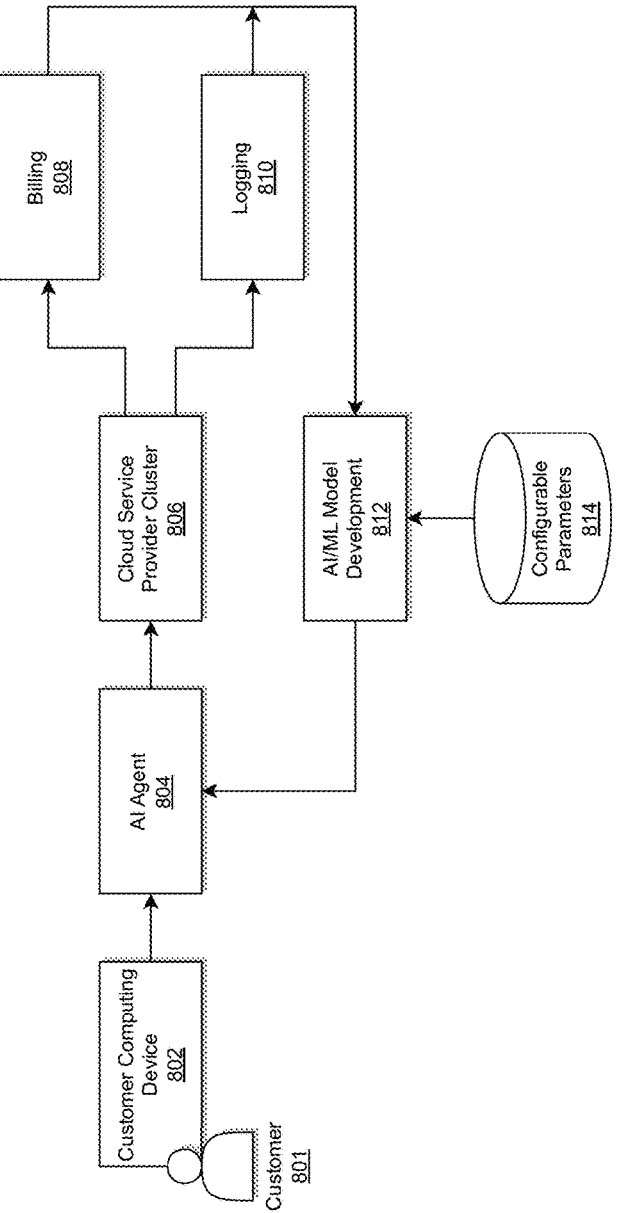
FIG. 8 illustrates an exemplary use case for selecting service tier using AI/ML based subscription service implemented by the language and platform agnostic smart cloud subscription module of FIG. 4 in accordance with an exemplary embodiment.

FIG. 8 illustrates an exemplary use case 800 for selecting service tier using AI/ML based subscription service implemented by the language and platform agnostic SCSM 406 of FIG. 4 in accordance with an exemplary embodiment. As illustrated in FIG. 8, the customer computing device 802 is operatively connected to an AI agent 804, the AI agent 804 is operatively connected to a cloud service provider cluster 806. The cloud service provider cluster 806 may be operatively connected to a billing system 808 and a logging system 810. Input data provided by the customer 801 may flow from the customer computing device 802 to the AI agent 804. Data from the AI agent 804 may flow to the cloud service provider cluster 806 which may then flow to each of the billing system 808 and the logging system 810. Data from each of the billing system 808 and the logging system 810 may then flow to the AI/ML development block 812 which outputs an AI/ML based model to the AI agent 804. The AI/ML development block 812 may access configurable parameters from the database 814 and utilizes data received from the billing system 808 and the logging system 810 to build the AI/ML based model.

FIG. 9 illustrates an exemplary table 900 that illustrates an algorithm for generating AI/ML decision implemented by the language and platform agnostic SCSM 406 of FIG. 4 in accordance with an exemplary embodiment. As illustrated in FIG. 9, the table 900 may include a column for performance, a column for cost savings, traffic, reward, and AI decision, but the disclosure is not limited thereto. For example, when the performance is high, cost savings are less, and reward is high, the SCSM 406 outputs an AI decision of "more number of clusters." On the other hand, when the performance is low, cost savings are high, and reward is less, the SCSM 406 outputs an AI decision of "less number of clusters," but the disclosure is not limited thereto.

Figure 10:
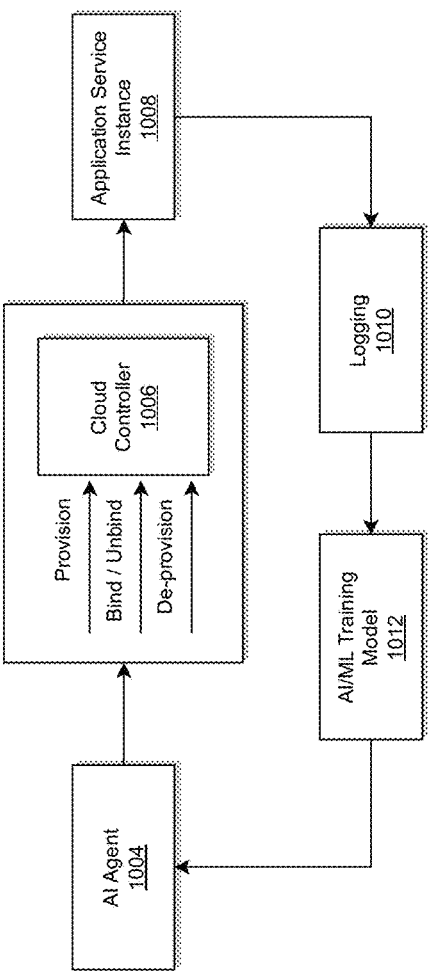
FIG. 10 illustrates another exemplary use case for running smart subscription within the cloud service provider implemented by the language and platform agnostic smart cloud subscription module of FIG. 4 in accordance with an exemplary embodiment.
Figure 10:

FIG. 10 illustrates another exemplary use case 1000 for running smart subscription within the cloud service provider implemented by the language and platform agnostic SCSM 406 of FIG. 4 in accordance with an exemplary embodiment. The exemplary use case 1000 illustrates a feedback loop system created by an AI agent 1004, cloud controller 1006, an application service instance 1008, a logging system 1010, and an AI/ML training model 1012. For example, data, i.e., provision data, bind/unbind data, de-provision data, from the AI agent 1004 may flow the cloud controller 1006. The data from the cloud controller 1006 may flow to the application service instance 1008. The data from the application service instance 1008 may flow to the logging system 1010. The data from the logging system 1010 may flow to the AI/ML training model 1012, and the data from the AI/ML training model 1012 may then flow back to the AI agent 1004 and continues to feedback process.

Figure 11:
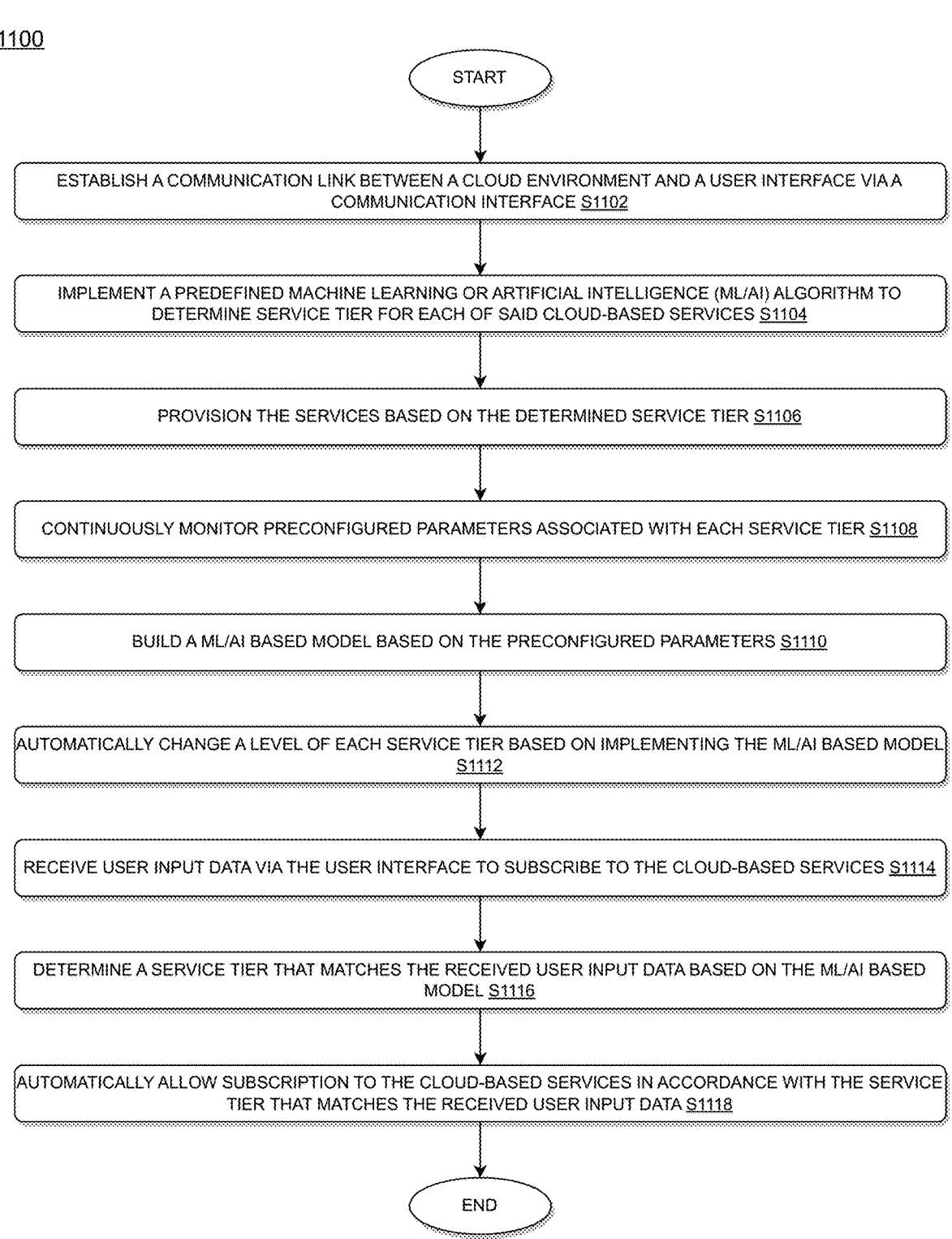
FIG. 11 illustrates an exemplary flow chart implemented by the language and platform agnostic smart cloud subscription module of FIG. 4 for providing, in cloud based services environment, customers to subscribe, monitor, and switch to different available tiers in an automated way in accordance with an exemplary embodiment.

FIG. 11 illustrates an exemplary flow chart 1100 implemented by the platform and language agnostic SCSM 406 of FIG. 4 for providing, in cloud based services environment, customers to subscribe, monitor, and switch to different available tiers in an automated way in accordance with an exemplary embodiment. It may be appreciated that the illustrated process 1100 and associated steps may be performed in a different order, with illustrated steps omitted, with additional steps added, or with a combination of reordered, combined, omitted, or additional steps.

As illustrated in FIG. 11, at step S1102, the process 1100 may establishing a communication link between a cloud environment and a user interface via a communication interface, wherein cloud-based services are hosted in the cloud environment.

At step S1104, the process 1100 may include implementing a predefined ML/AI algorithm to determine service tier for each of said cloud-based services.

At step S1106, the process 1100 may include provisioning the services based on the determined service tier.

At step S1108, the process 1100 may include continuously monitoring preconfigured parameters associated with each service tier.

At step S1110, the process 1100 may include building a ML/AI based model based on the preconfigured parameters.

At step S1112, the process 1100 may include automatically changing a level of each service tier based on implementing the ML/AI based model.

At step S1114, the process 1100 may include receiving user input data via the user interface to subscribe to the cloud-based services.

At step S1116, the process 1100 may include determining a service tier that matches the received user input data based on the ML/AI based model.

At step S1118, the process 1100 may include automatically allowing subscription to the cloud-based services in accordance with the service tier that matches the received user input data.

According to exemplary embodiments, in the process 1100, the preconfigured parameters may include one or more of the following parameters: traffic data associated with each service tier; memory capacity data of each database associated with each service tier; and CPU usage data associated with each service tier, but the disclosure is not limited thereto. The process 1100 may further include continuously monitoring the traffic data, memory capacity data, and the CPU usage data of associated with each service tier.

According to exemplary embodiments, the process 1100 may further include automatically changing the level of each service tier from a higher level to a lower level when it is determined that the traffic data, or the memory capacity data, or the CPU usage data associated with corresponding service tier is below a predetermined threshold value.

According to exemplary embodiments, the process 1100 may further include automatically updating the ML/AI model in accordance with the changed level of the corresponding service tier.

According to exemplary embodiments, the process 1100 may further include automatically changing the level of each service tier from a lower level to a higher level when it is determined that the traffic data, or the memory capacity data, or the CPU usage data associated with corresponding service tier is equal to or above a predetermined threshold value.

According to exemplary embodiments, the process 1100 may further include automatically updating the ML/AI model in accordance with the changed level of the corresponding service tier.

Figure 12:
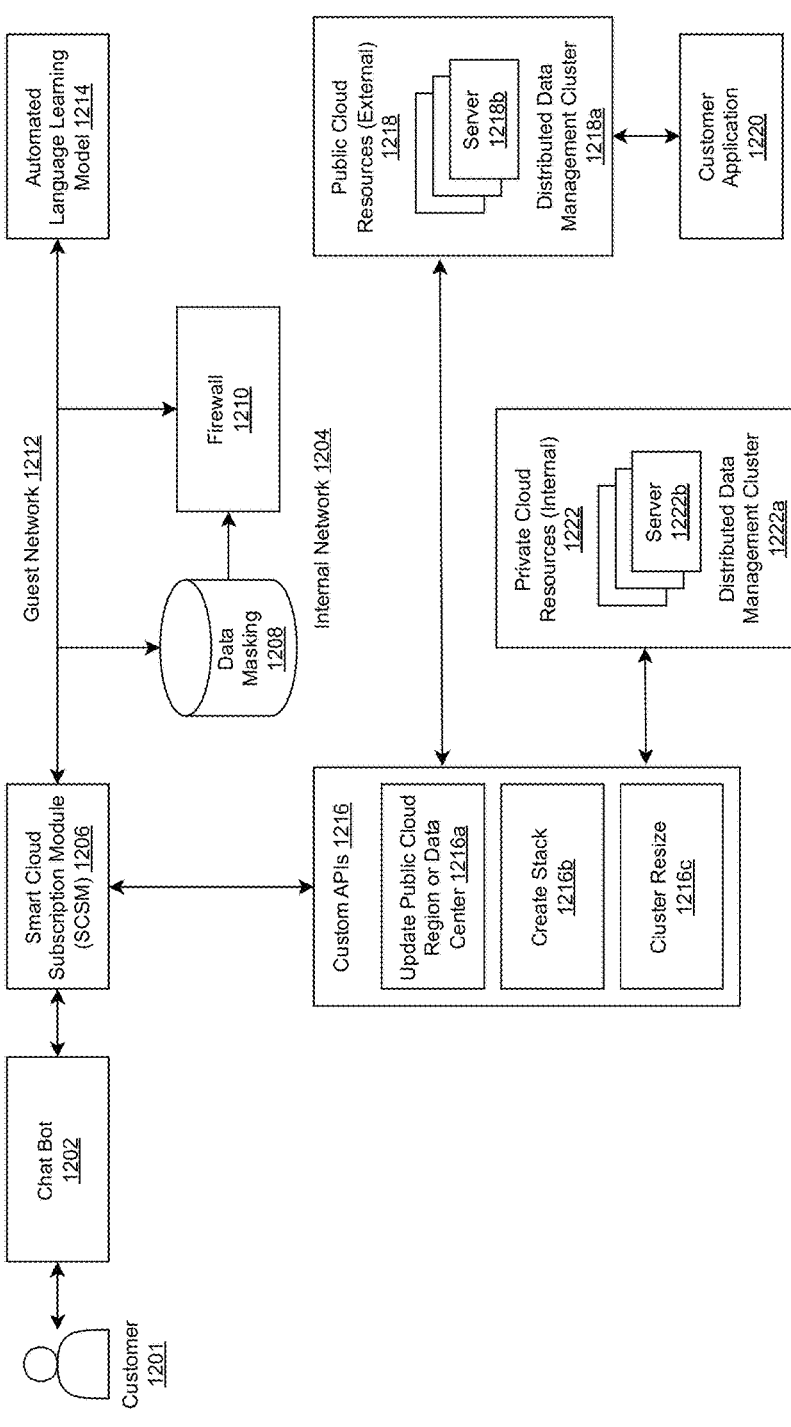
FIG. 12 illustrates an exemplary smart subscription architecture as implemented by the language and platform agnostic smart cloud subscription module of FIG. 4 for providing, in cloud based services environment, customers to subscribe, monitor, and switch to different available tiers in an automated way in accordance with an exemplary embodiment.
Figure 13:
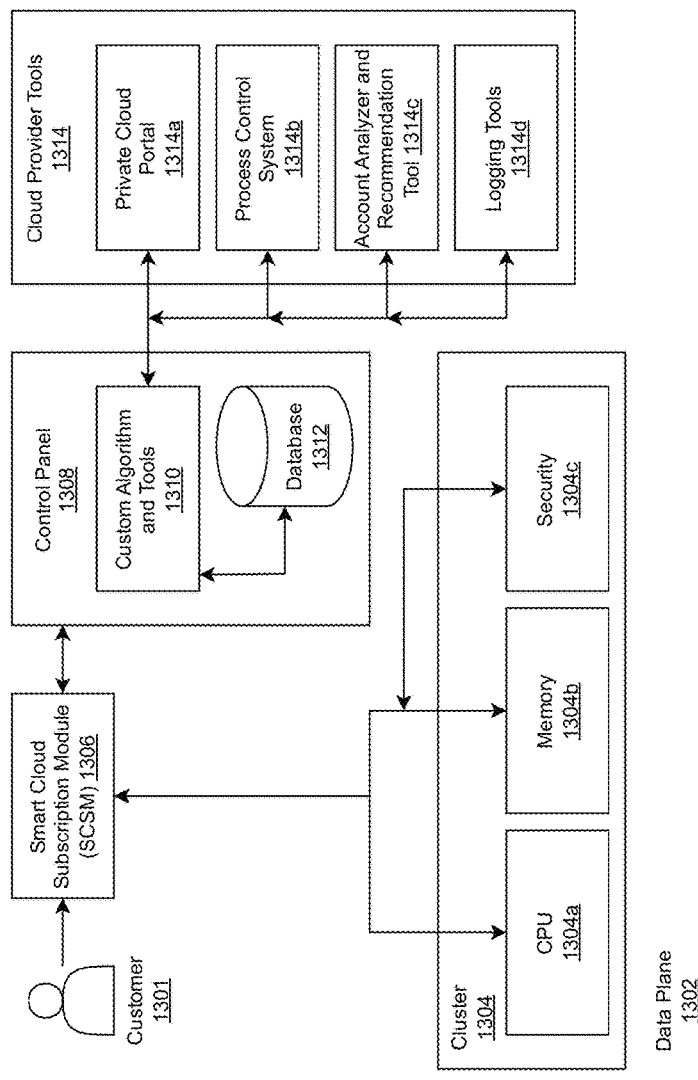
FIG. 13 illustrates an exemplary custom APIs architecture as implemented by the language and platform agnostic smart cloud subscription module of FIG. 4 in accordance with an exemplary embodiment.

For example, the process 1100 may implement a high level smart subscription architecture and custom APIs high level architecture. For example, FIG. 12 illustrates an exemplary smart subscription architecture 1200 as implemented by the language and platform agnostic SCSM 406 of FIG. 4 (or SCSM 1206 of FIG. 12) for providing, in cloud based services environment, customers to subscribe, monitor, and switch to different available tiers in an automated way in accordance with an exemplary embodiment. FIG. 13 illustrates an exemplary custom APIs architecture 1300 as implemented by the language and platform agnostic SCSM 406 of FIG. 4 (or SCSM 1206 of FIG. 12) in accordance with an exemplary embodiment.

As illustrated in FIG. 12, the exemplary smart subscription architecture 1200 may include a chat bot 1202 that may receive input data entered by a user 1201 by utilizing a customer computer device (i.e., 502 (FIG. 5), 702 (FIG. 7), 802 (FIG. 8)). The SCSM 1206 may receive the output data from the chat bot 1202 as input and trigger the custom APIs 1216 and the automated language learning model (LLM) 1214. According to exemplary embodiments, the automated LLM 1214 may be Chat GPT, but the disclosure is not limited thereto. The SCSM 1206 may bi-directionally communicated with the automated LLM 1214 for data exchange by utilizing a guest network 1212. The SCSM 1206 may also bi-directionally communicated with the automated LLM 1214 for data exchange by utilizing an internal network 1204 that utilizes a data masking 1206 database and corresponding firewall 1210. The custom APIs 1216 may be invoked to transfer data to the public cloud resources (external) 1218 and/or the private cloud resources (internal) 1222.

According to exemplary embodiments, the custom APIs may include an update public region or data center 1216*a* API, create stack 1216*b* API, and cluster resize 1216*c* API.

According to exemplary embodiments, within the public cloud environment, the public cloud resources (external) 1218 may be operatively connected with a customer application 1220 for allowing customer 1201 to subscribe, monitor, and switch to different available tiers in an automated way through implementation of the distributed data management cluster 1218*a* and the server 1218*b*.

According to exemplary embodiments, within the private cloud environment, the private cloud resources (internal) 1222 may be operatively connected with the customer application 1220 for allowing customer 1201 to subscribe, monitor, and switch to different available tiers in an automated way through implementation of the distributed data management cluster 1222*a* and the server 1222*b*.

As illustrated in FIG. 13, the exemplary custom APIs high level architecture 1300 may include an SCSM 1306 operatively connected with a data plane 1302, a control panel 1308, and a cloud provider tools 1314. The data plane 1302 may include a cluster 1304 having a CPU 1304*a*, memory 1304*b*, and security 1304*c*. The control panel 1308 may include custom algorithm and tools 1310 and a database 1312. The cloud provider tools 1314 may include private cloud portal 1314*a*, a process control system 1314*b*, an account analyzer and recommendation tool 1314*c*, and logging tools 1314*d*.

According to exemplary embodiments, the SCSM 1306 may receive input data entered by a user 1301 by utilizing a customer computer device (i.e., 502 (FIG. 5), 702 (FIG. 7), 802 (FIG. 8)). The SCSM 1206 may also receive the output data from the data plane 1302 from corresponding cluster 1304, e.g., data related to CPU 1304*a*, data related memory 1304*b*, and data related security 1304*c*, as input and trigger the control panel 1308 which in turn may trigger the cloud provider tools 1314, e.g., the private cloud portal 1314*a*, the process control system 1314*b*, the account analyzer and recommendation tool 1314*c*, and the logging tools 1314*d* so that the customer 1301 may utilize the SCSM 1306 to subscribe, monitor, and switch to different available tiers in an automated way as disclosed herein with respect to FIGS. 4-12.

For example, data may bidirectionally flow between the custom algorithm and tools 1310 and the database 1312. Output data from the custom algorithm and tools may flow to each of the private cloud portal 1314*a*, process control system 1314*b*, account analyzer and recommendation tool 1314*c* and the logging tools 1314*d* as input data. Also, output data from each of the private cloud portal 1314*a*, process control system 1314*b*, account analyzer and recommendation tool 1314*c* and the logging tools 1314*d* may flow to the custom algorithm and tools 1310 as input.

Accordingly, the present disclosure, through one or more of its various aspects, embodiments, and/or specific features or sub-components provides, among other features, various systems, servers, devices, methods, media, programs, and platforms for implementing the language and platform agnostic SCSM 406, 1206 and 1306 configured to provide, in cloud based services environment, ML/AI based automated decision making to subscribe to and/or switch to different available tiers, but the disclosure is not limited thereto.

According to exemplary embodiments, the SCSD 402 may include a memory (e.g., a memory 106 as illustrated in FIG. 1) which may be a non-transitory computer readable medium that may be configured to store instructions for implementing a platform and language agnostic SCSM 406 for providing, in cloud based services environment, customers to subscribe, monitor, and switch to different available tiers in an automated way as disclosed herein. The SCSD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SCSM 406, 506, 1206, 1306, or within the SCSD 402, may be used to perform one or more of the methods and processes as described herein. In a particular embodiment, the instructions may reside completely, or at least partially, within the memory 106, the medium reader 112, and/or the processor 104 (see FIG. 1) during execution by the SCSD 402.

According to exemplary embodiments, the instructions, when executed, may cause a processor embedded within the SCSM 406 or the SCSD 402 to perform the following: establishing a communication link between a cloud environment and a user interface via a communication interface, wherein cloud-based services are hosted in the cloud environment; implementing a predefined ML/AI algorithm to determine service tier for each of said cloud-based services; provisioning the services based on the determined service tier; continuously monitoring preconfigured parameters associated with each service tier; building a ML/AI based model based on the preconfigured parameters; automatically changing a level of each service tier based on implementing the ML/AI based model; receiving user input data via the user interface to subscribe to the cloud-based services; determining a service tier that matches the received user input data based on the ML/AI based model; and automatically allowing subscription to the cloud-based services in accordance with the service tier that matches the received user input data. According to exemplary embodiments, the processor may be the same or similar to the processor 104 as illustrated in FIG. 1 or the processor embedded within SCSD 202, SCSD 302, SCSD 402, and SCSM 406, 1206, 1306.

According to exemplary embodiments, the instructions, when executed, may cause the processor 104 to perform the following: continuously monitoring the traffic data, memory capacity data, and the CPU usage data of associated with each service tier.

According to exemplary embodiments, the instructions, when executed, may cause the processor 104 to perform the following: automatically changing the level of each service tier from a higher level to a lower level when it is determined that the traffic data, or the memory capacity data, or the CPU usage data associated with corresponding service tier is below a predetermined threshold value.

According to exemplary embodiments, the instructions, when executed, may cause the processor 104 to perform the following: automatically updating the ML/AI model in accordance with the changed level of the corresponding service tier.

According to exemplary embodiments, the instructions, when executed, may cause the processor 104 to perform the following: automatically changing the level of each service tier from a lower level to a higher level when it is determined that the traffic data, or the memory capacity data, or the CPU usage data associated with corresponding service tier is equal to or above a predetermined threshold value.

According to exemplary embodiments, the instructions, when executed, may cause the processor 104 to perform the following: automatically updating the ML/AI model in accordance with the changed level of the corresponding service tier.

According to exemplary embodiments as disclosed above in FIGS. 1-11, technical improvements effected by the instant disclosure may include a platform for implementing a language and platform agnostic smart cloud subscription module configured to provide, in cloud based services environment, customers to subscribe, monitor, and switch to different available tiers in an automated way based on changing business and/or customer needs, but the disclosure is not limited thereto. For example, according to exemplary embodiments as disclosed above in FIGS. 1-11, technical improvements effected by the instant disclosure may include a platform for implementing a language and platform agnostic smart cloud subscription module configured to provide, in cloud based services environment, ML/AI based automated decision making to subscribe to and/or switch to different available tiers, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automated subscription to cloud-based services by utilizing one or more processors along with allocated memory, the method comprising:

establishing a communication link between a cloud environment and a user interface via a communication interface, wherein cloud-based services are hosted in the cloud environment;

implementing a predefined machine learning or artificial intelligence (ML/AI) algorithm to determine service tier for each of said cloud-based services;

provisioning the services based on the determined service tier;

continuously monitoring preconfigured parameters associated with each service tier;

building a ML/AI based model based on the preconfigured parameters;

automatically changing a level of each service tier based on implementing the ML/AI based model;

receiving user input data via the user interface to subscribe to the cloud-based services;

determining a service tier that matches the received user input data based on the ML/AI based model; and automatically allowing subscription to the cloud-based services in accordance with the service tier that matches the received user input data, wherein the preconfigured parameters include one or more of the following parameters: traffic data associated with each service tier; memory capacity data of each database associated with each service tier; and CPU usage data associated with each service tier, and the method further comprising:

continuously monitoring the traffic data, memory capacity data, and the CPU usage data associated with each service tier;

automatically changing the level of each service tier from a higher level to a lower level when it is determined that the traffic data, or the memory capacity data, or the CPU usage data associated with corresponding service tier is below a predetermined threshold value; and automatically updating the ML/AI model in accordance with the changed level of the corresponding service tier.

2. A system for automated subscription to cloud-based services, the system comprising:

a processor; and a memory operatively connected to the processor via a communication interface, the memory storing computer readable instructions, when executed, causes the processor to:

establish a communication link between a cloud environment and a user interface via a communication interface, wherein cloud-based services are hosted in the cloud environment;

implement a predefined machine learning or artificial intelligence (ML/AI) algorithm to determine service tier for each of said cloud-based services;

provision the services based on the determined service tier;

continuously monitor preconfigured parameters associated with each service tier;

build a ML/AI based model based on the preconfigured parameters;

automatically change a level of each service tier based on implementing the ML/AI based model;

receive user input data via the user interface to subscribe to the cloud-based services;

determine a service tier that matches the received user input data based on the ML/AI based model; and automatically allow subscription to the cloud-based services in accordance with the service tier that matches the received user input data, wherein the preconfigured parameters include one or more of the following parameters: traffic data associated with each service tier; memory capacity data of each database associated with each service tier; and CPU usage data associated with each service tier, and wherein the processor is further configured to:

continuously monitor the traffic data, memory capacity data, and the CPU usage data associated with each service tier;

automatically change the level of each service tier from a higher level to a lower level when it is determined that the traffic data, or the memory capacity data, or the CPU usage data associated with corresponding service tier is below a predetermined threshold value; and automatically update the ML/AI model in accordance with the changed level of the corresponding service tier.

3. A non-transitory computer readable medium configured to store instructions for automated subscription to cloud-based, the instructions cause a processor to perform the following:

establishing a communication link between a cloud environment and a user interface via a communication interface, wherein cloud-based services are hosted in the cloud environment;

implementing a predefined machine learning or artificial intelligence (ML/AI) algorithm to determine service tier for each of said cloud-based services;

provisioning the services based on the determined service tier;

continuously monitoring preconfigured parameters associated with each service tier;

building a ML/AI based model based on the preconfigured parameters;

automatically changing a level of each service tier based on implementing the ML/AI based model;

receiving user input data via the user interface to subscribe to the cloud-based services;

determining a service tier that matches the received user input data based on the ML/AI based model; and automatically allowing subscription to the cloud-based services in accordance with the service tier that matches the received user input data, wherein the preconfigured parameters include one or more of the following parameters: traffic data associated with each service tier; memory capacity data of each database associated with each service tier; and CPU usage data associated with each service tier; and wherein the instructions, when executed, cause the processor to further perform the following:

continuously monitoring the traffic data, memory capacity data, and the CPU usage data associated with each service tier;

automatically changing the level of each service tier from a higher level to a lower level when it is determined that the traffic data, or the memory capacity data, or the CPU usage data associated with corresponding service tier is below a predetermined threshold value; and automatically updating the ML/AI model in accordance with the changed level of the corresponding service tier.

* * * * *